(12) United States Patent
Kobayashi et al.

(10) Patent No.: US 12,024,225 B1
(45) Date of Patent: Jul. 2, 2024

(54) STEERING CONTROL METHOD AND STEERING CONTROL DEVICE

(71) Applicant: Nissan Motor Co., Ltd., Yokohama (JP)

(72) Inventors: Junya Kobayashi, Kanagawa (JP); Teruhisa Takano, Kanagawa (JP); Yasuhiro Sakurai, Kanagawa (JP); Ryota Yamanaka, Kanagawa (JP); Yoshitsugu Takafuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/559,573

(22) PCT Filed: May 28, 2021

(86) PCT No.: PCT/JP2021/020489
§ 371 (c)(1),
(2) Date: Nov. 8, 2023

(87) PCT Pub. No.: WO2022/249474
PCT Pub. Date: Dec. 1, 2022

(51) Int. Cl.
*B62D 15/02* (2006.01)

(52) U.S. Cl.
CPC ..... *B62D 15/0265* (2013.01); *B62D 15/0285* (2013.01)

(58) Field of Classification Search
CPC ........... B62D 15/0265; B62D 15/0285; B60W 30/06; B60W 2554/20; B60W 10/20; G06V 20/58; B60R 2300/806; G05D 1/0238
See application file for complete search history.

(56) References Cited

U.S. PATENT DOCUMENTS

| | | | | |
|---|---|---|---|---|
| 2004/0204807 A1* | 10/2004 | Kimura | ..................... | G06T 7/60 701/1 |
| 2015/0032319 A1* | 1/2015 | Kim | ..................... | B62D 15/027 701/23 |

(Continued)

FOREIGN PATENT DOCUMENTS

| | | |
|---|---|---|
| CN | 111483459 A | 8/2020 |
| CN | 111661041 A | 9/2020 |

(Continued)

OTHER PUBLICATIONS

Chinese Office Action of May 18, 2024 of corresponding Chinese Patent Application No. 202180098546.3.

*Primary Examiner* — Kenneth J Malkowski
(74) *Attorney, Agent, or Firm* — Global IP Counselors, LLP (57) ABSTRACT

A steering control device is configured to acquire a distance from a vehicle to obstacles detected by a distance detection sensor. The steering control device calculates a first target steering angle such that a steering angle increases for moving the vehicle in a direction away from the obstacle located on a left side with respect to a traveling direction as the vehicle travels as the distance to the obstacle decreases, and calculates a second target steering angle such that a steering angle increases for moving the vehicle in a direction away from the obstacle located on a right side with respect to the traveling direction as the vehicle travels as the distance to the obstacle decreases. Then, the steering control device adds the first and second target steering angles to calculate a final steering angle, and control the steered wheels of the vehicle based on the final steering angle.

9 Claims, 5 Drawing Sheets

(56) References Cited

U.S. PATENT DOCUMENTS

| | | | | |
|---|---|---|---|---|
| 2017/0129486 A1* | 5/2017 | Nakada | ................ | G06V 20/586 |
| 2018/0162446 A1* | 6/2018 | Mikuriya | ............. | B62D 15/028 |

FOREIGN PATENT DOCUMENTS

| | | | |
|---|---|---|---|
| JP | 2000-128006 | A | 5/2000 |
| JP | 2001-18821 | A | 1/2001 |
| JP | 2004-152117 | A | 5/2004 |
| JP | 2008-74296 | A | 4/2008 |
| JP | 2010-285028 | A | 12/2010 |
| JP | 2018-131167 | A | 8/2018 |
| JP | 2018-176909 | A | 11/2018 |
| JP | 2020-90145 | A | 6/2020 |
| WO | 2020/066329 | A1 | 4/2020 |

* cited by examiner

| PARAMETER | VALUE |
|---|---|
| $D_{start}$ | 1.5 m |
| $D_{end}$ | 2.0 m |
| $D_{min}$ | 0.5 m |
| $\theta_{Lmin}$ | 10 deg |
| $\theta_{Rmin}$ | −10 deg |
| $\theta_{Lmax}$ | 60 deg |
| $\theta_{Rmax}$ | −60 deg |

FIG. 8

| TIME t | $D_L$ m | $D_R$ m | $\theta_L$ deg | $\theta_R$ deg | $\theta (= \theta_L + \theta_R)$ deg |
|---|---|---|---|---|---|
| t1 | NO DETECTION | NO DETECTION | 0 | 0 | 0 |
| t2 | 1.7 | NO DETECTION | 0 | 0 | 0 |
| t3 | 1.5 | NO DETECTION | 10 | 0 | 10 |
| t4 | 1.2 | 1.7 | 25 | 0 | 25 |
| t5 | 1.2 | 1.5 | 25 | −10 | 15 |
| t6 | 0.8 | 1.2 | 45 | −25 | 20 |
| t7 | 0.4 | 0.8 | 60 | −45 | 15 |
| t8 | 0.2 | 0.4 | 60 | −60 | 0 |
| t9 | 0.8 | 0.4 | 45 | −60 | −15 |
| t10 | 1.2 | 0.8 | 25 | −45 | −20 |
| t11 | 1.2 | 1.7 | 25 | −10 | 15 |
| t12 | 1.7 | NO DETECTION | 10 | 0 | 10 |

FIG. 9

STEERING CONTROL METHOD AND STEERING CONTROL DEVICE

CROSS-REFERENCE TO RELATED APPLICATIONS

This application is a U.S. national stage application of International Application No. PCT/JP2021/020489, filed on May 28, 2021.

BACKGROUND

Technical Field

The present invention relates to a steering control method and device for controlling the steering of a vehicle equipped with a distance detection sensor that detects the distance to an obstacle located around the vehicle.

Background Information

Japanese Laid-Open Patent Application No. 2008-74296 hereinafter referred to as Patent Document 1) of the prior art discloses a vehicle with a parking assisting function that enables the vehicle to park a vehicle within a parking space by using an external operation. In the vehicle with a parking assisting function disclosed in Patent Document 1, a vehicle user outside of the vehicle moves the vehicle into the parking space using switches for moving the vehicle provided on a smart key.

SUMMARY

However, the conventional vehicle with the parking assisting function described above has the problem that when an obstacle is detected while the vehicle is moving, the vehicle is stopped, so that the vehicle cannot be moved smoothly.

Thus, the present invention has been proposed in view of the circumstances described above, and an object thereof is to provide a steering control method and device capable of moving a vehicle smoothly while avoiding obstacles, even if such obstacles are detected as the vehicle is being moved.

In order to solve the problem described above, a steering control method and device according to one aspect of the present invention calculates a first target steering angle, so that a steering angle for moving the vehicle in a direction away from an obstacle located on the left side with respect to the direction of travel as the vehicle proceeds is increased as the distance to the obstacle decreases. On the other hand, a second target steering angle is calculated, so that the steering angle for moving the vehicle a direction away from an obstacle located on the right side with respect to the direction of travel as the vehicle proceeds is increased as the distance to the obstacle decreases. The first target steering angle and the second target steering angle are then added to calculate a final steering angle, and the steered wheels of the vehicle are controlled based on the final steering angle.

By using the present invention, a vehicle can be moved smoothly while avoiding obstacles, even if such obstacles are detected as the vehicle is being moved.

BRIEF DESCRIPTION OF THE DRAWINGS

Referring now to the attached drawings which form a part of this original disclosure.

DETAILED DESCRIPTION OF EMBODIMENTS

An embodiment to which the present invention is applied is described below with reference to the drawings. In the descriptions of the figures, identical parts have been assigned the same reference numerals, and detailed descriptions thereof have been omitted.

Figure 1:
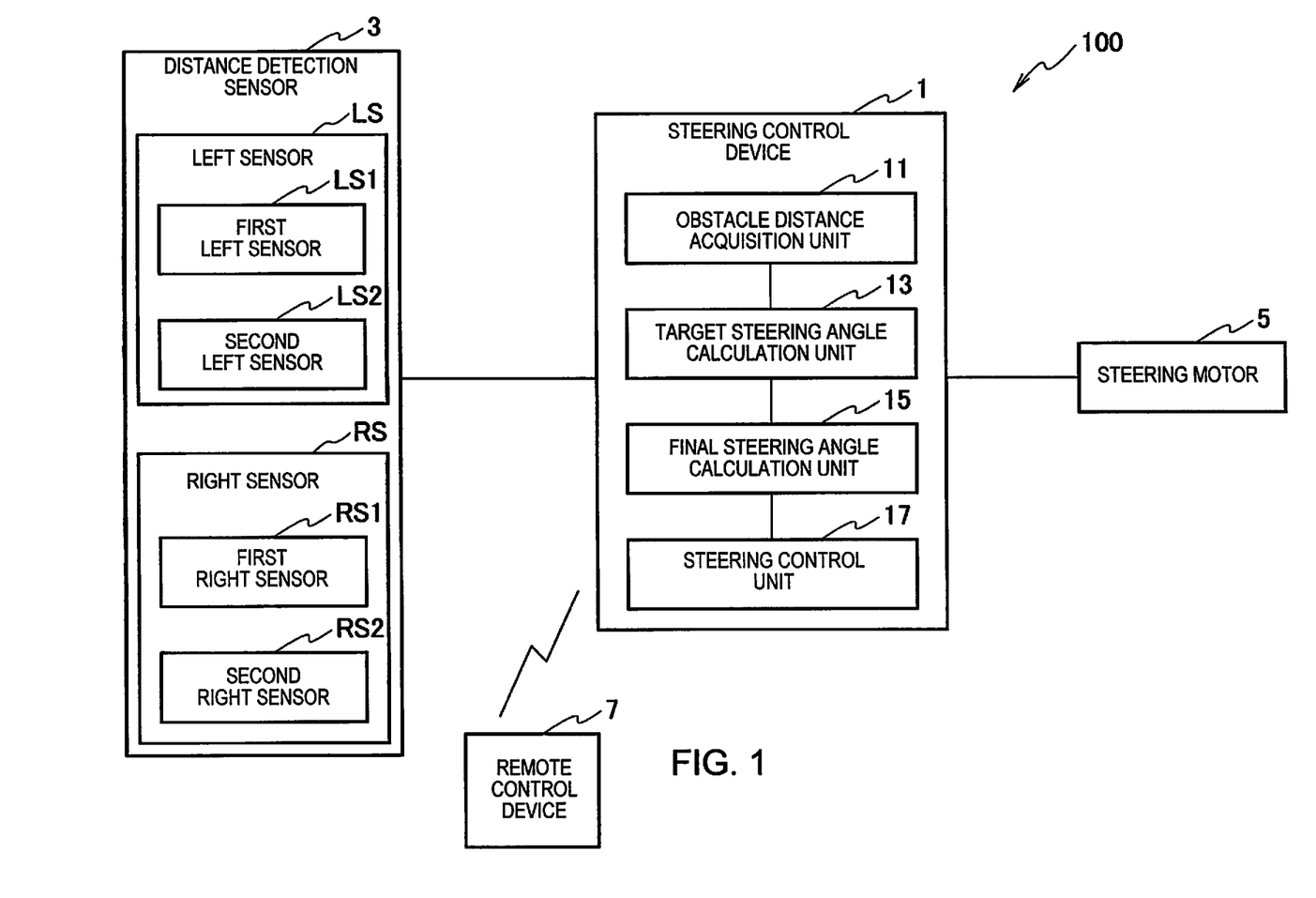
FIG. 1 is a block diagram showing the configuration of a vehicle equipped with a steering control device according to an embodiment of the present invention.

FIG. 1 shows a block diagram of the configuration of a vehicle equipped with the steering control device according to the present embodiment. As shown in FIG. 1, a vehicle 100 comprises a steering control device 1, a distance detection sensor 3, a steering motor 5, and a remote control device 7. The vehicle 100 can be remotely operated by a driver outside of the vehicle control by using the remote control device 7.

The distance detection sensor 3 detects the distance to an obstacle located around the vehicle 100 and is composed of a left sensor LS and a right sensor RS. The left sensor LS detects the distance to an obstacle located on the left side with respect to the direction of travel of the vehicle 100 and is composed of a first left sensor LS1 and a second left sensor LS2. The right sensor RS detects the distance to an obstacle located on the right side with respect to the direction of travel of the vehicle 100 and is composed of a first right sensor RS1 and a second right sensor RS2.

Figure 2:
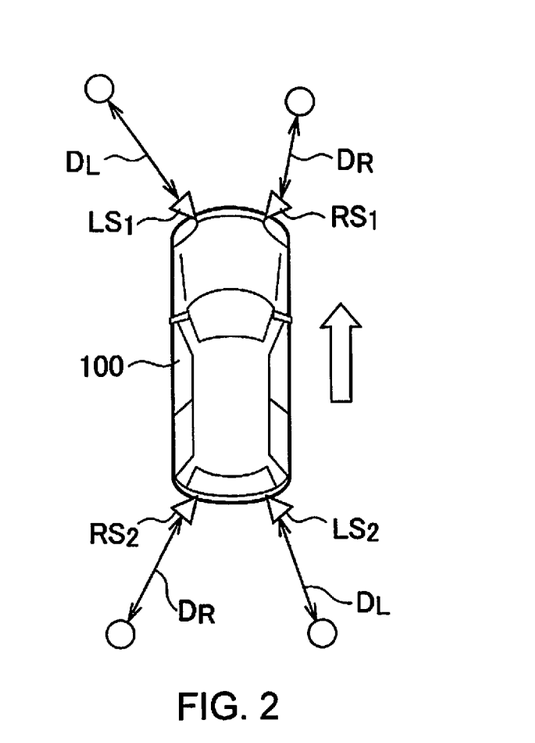
FIG. 2 is a diagram showing the arrangement of a distance detection sensor in a vehicle equipped with the steering control device according to the embodiment of the present invention.

As shown in FIG. 2, the first left sensor LS1 is a sensor for detecting an obstacle located on the left side of the direction of travel when the vehicle 100 is moving forward and for detecting a distance $D_L$ to the obstacle. The second left sensor LS2 is a sensor for detecting an obstacle located on the left side with respect to the direction of travel when the vehicle 100 is moving backwards and for detecting the distance $D_L$ to the obstacle. The second left sensor LS2 is installed at the right rear portion of the vehicle 100, but when the vehicle 100 is moving backwards, it detects obstacles on the left side with respect to the direction of travel of the vehicle 100, which is moving backwards; hence, this sensor is a left sensor.

Furthermore, the first right sensor RS1 is a sensor for detecting an obstacle located on the right side with respect to the direction of travel when the vehicle 100 is moving forward and for detecting a distance $D_R$ to the obstacle. The second right sensor RS2 is a sensor for detecting an obstacle located on the right side with respect to the direction of travel when the vehicle 100 is moving backwards and for detecting the distance $D_R$ to the obstacle. The second right sensor RS2 is installed at the left rear portion of the vehicle 100, but when the vehicle 100 is moving backwards, it detects obstacles on the right side with respect to the direction of travel of the vehicle 100, which is moving backwards; hence, this sensor is a right sensor.

The left sensor LS and the right sensor RS each comprises a sonar device, which emit sound waves in different non-overlapping regions in a prescribed region on the left side with respect to the direction of travel of the vehicle and a prescribed region on the right side with respect the direction of travel of the vehicle, and detect the distance from the vehicle 100 to an obstacle based on reflected waves from the obstacle. However, as long as it is possible to detect the distance to the obstacle, other types of sensors may be used besides sonar, such as a camera or a laser range finder. However, the left sensor LS and the right sensor RS need only be able to detect the distance from the vehicle 100 to the obstacle, and need not be able to detect the position (coordinates) of the obstacle with respect to the vehicle 100. For this reason, in general, a less expensive system can be configured by using sonar, which can detect only the distance from the vehicle 100 to the obstacle, instead of a camera or laser range finder, which can detect the position of the obstacle as well as the distance to the obstacle.

The steering control device 1 controls the steered wheels of the vehicle 100 so as to avoid the obstacle based on the distance from the vehicle 100 to the obstacle detected by the distance detection sensor 3. The steering control device 1 is installed in the vehicle 100 and comprises an obstacle distance acquisition unit 11, a target steering angle calculation unit 13, a final steering angle calculation unit 15, and a steering control unit 17. The steering control of the steering control device 1 may be applied to the control of the steered wheels when the vehicle 100 is parked automatically in a parking space or when the vehicle 100 is parked by the driver while outside the vehicle by operating the remote control device 7.

The obstacle distance acquisition unit 11 acquires the distance from the vehicle 100 to the obstacle detected by the distance detection sensor 3. Specifically, when the vehicle 100 is moving forward, the obstacle distance acquisition unit 11 acquires the distance $D_L$ from the first left sensor LS1 to an obstacle on the left side with respect to the direction of travel and the distance $D_R$ from the first right sensor RS1 to an obstacle on the right side with respect to the direction of travel. Further, when the vehicle 100 is moving backwards, the obstacle distance acquisition unit 11 acquires the distance $D_L$ from the second left sensor LS2 to an obstacle on the left side (looking rearwards) with respect to the direction of travel, and acquires the distance $D_R$ from the second right sensor RS2 to an obstacle on the right side (looking rearwards) with respect to the direction of travel.

The target steering angle calculation unit 13 calculates the first target steering angle and the second target steering angle based on the distance to the obstacle acquired by the obstacle distance acquisition unit 11. The first target steering angle is the target steering angle for avoiding obstacles located on the left side with respect to the direction of travel of the vehicle 100, and is the rightward steering angle when the vehicle 100 is moving forward and the leftward steering angle when the vehicle is moving backwards. Further, the second target steering angle is the target steering angle for avoiding obstacles located on the right side with respect to the direction of travel of the vehicle 100, and is the leftward steering angle when the vehicle 100 is moving forward and the rightward steering angle when the vehicle is moving backwards. That is, both the first target steering angle and the second target steering angle are steering angles for moving the vehicle away from an obstacle as the vehicle proceeds. The first target steering angle is calculated based only on the distance to the obstacle detected by the left sensor LS, and the second target steering angle is calculated based only on the distance to the obstacle detected by the right sensor RS. The first target steering angle and the second target steering angle are calculated such that one is a positive value (a positive value, the absolute value of which increases as the steering angle increases) and the other is a negative value (a negative value, the absolute value of which increases as the steering angle increases).

The target steering angle calculation unit 13 calculates the first target steering angle so that the steering angle for moving the vehicle 100 in a direction away from an obstacle located on the left side with respect to the direction of travel as the vehicle 100 proceeds is increased as the distance to the obstacle decreases. Further, the target steering angle calculation unit 13 calculates a second target steering angle so that the steering angle for moving the vehicle 100 in a direction away from an obstacle located on the right side with respect to the direction of travel as the vehicle 100 proceeds is increased as the distance to the obstacle decreases.

For example, if there is an obstacle on the left side with respect to the direction of travel when the vehicle 100 is moving forward, the "steering angle for moving the vehicle in a direction away from the obstacle as the vehicle 100 proceeds" is the rightward steering angle. Thus, the first target steering angle is calculated such that the rightward steering angle increases as the distance to the obstacle decreases. On the other hand, if there is an obstacle on the left side with respect to the direction of travel (rearwards) when the vehicle 100 is moving backwards, the "steering angle for moving the vehicle in a direction away from the obstacle as the vehicle 100 proceeds" is the leftward steering angle. Thus, the first target steering angle is calculated such that the leftward steering angle increases as the distance to the obstacle decreases.

Figure 3:
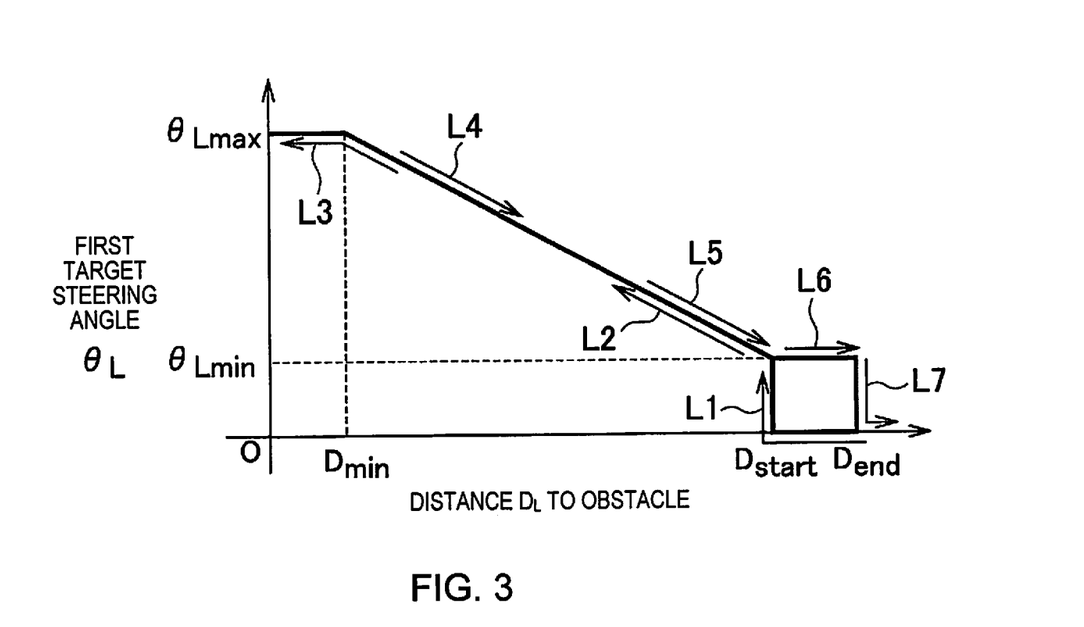
FIG. 3 is a diagram for explaining the method of calculating a first target steering angle by using the steering control device according to the embodiment of the present invention.

Here, with reference to FIG. 3, the method of calculating the first target steering angle $\theta_L$, which is the target steering angle for avoiding an obstacle located on the left side with respect to the direction of travel of the vehicle 100, will be described. As shown in FIG. 3, the target steering angle calculation unit 13 sets the first target steering angle $\theta_L$ to 0 if the distance $D_L$ to the obstacle is greater than a preset steering start distance Dstart. If the distance $D_L$ to the obstacle is less than or equal to the steering start distance Dstart, then the calculation of the first target steering angle $\theta_L$ is started. That is, the calculation of the first target steering angle $\theta_L$ is started when an obstacle located on the left side with respect to the direction of travel of the vehicle 100 is approached and the distance $D_L$ to the obstacle changes from a value greater than the preset steering start distance Dstart to a value less than or equal to the steering start distance Dstart. The steering start distance Dstart is the distance at which steering of the vehicle 100 must be started to avoid the obstacle and is set in advance empirically or by simulation.

First, when the distance $D_L$ to the obstacle decreases from a value greater than the steering start distance Dstart to the steering start distance Dstart, the target steering angle calculation unit 13 sets the first target steering angle $\theta_L$ to a minimum steering angle $\theta_{Lmin}$ (L1). The minimum steering angle $\theta_{Lmin}$ is the minimum steering angle set when the steering of the vehicle is started to avoid the obstacle and is set in advance empirically of or by simulation.

Then, as the vehicle 100 proceeds and approaches the obstacle as the distance $D_L$ to the obstacle decreases, the first target steering angle $\theta_L$ is increased as the distance $D_L$ to the obstacle decreases (L2). That is, the target steering angle calculation unit 13 calculates the first target steering angle $\theta_L$ so that the steering angle for moving the vehicle in a direction away from the obstacle as the vehicle 100 proceeds is increased as the distance $D_L$ to the obstacle decreases.

When the distance $D_L$ to the obstacle reaches a minimum steering distance Dmin, the target steering angle calculation unit 13 then sets the first target steering angle $\theta_L$ to a maximum steering angle $\theta_{Lmax}$ and maintains the maximum steering angle $\theta_{Lmax}$ even if the distance $D_L$ to the obstacle continues to decrease (L3). Here, the minimum steering distance Dmin is the minimum distance required to avoid an obstacle by using steering, and is set in advance empirically or by simulation. Further, the maximum steering angle $\theta_{Lmax}$ is the maximum steering angle set to avoid an obstacle and is set in advance empirically or by simulation.

Thereafter, as the vehicle 100 proceeds, moving away from the obstacle as the distance $D_L$ to the obstacle increases, the first target steering angle $\theta_L$ is decreased as the distance $D_L$ to the obstacle increases (L4). That is, the target steering angle calculation unit 13 calculates the first target steering angle $\theta_L$, so that the steering angle in the direction away from the obstacle as the vehicle 100 proceeds is decreased as the distance $D_L$ to the obstacle increases.

When the distance $D_L$ to the obstacle changes from a value smaller than the steering start distance Dstart to the steering start distance Dstart, the target steering angle calculation unit 13 then sets the first target steering angle $\theta_L$ to the minimum steering angle $\theta_{Lmin}$ (L5).

Thereafter, while the distance $D_L$ to the obstacle changes from the steering start distance Dstart to an even larger value to a steering end distance Dend, the target steering angle calculation unit 13 maintains the first target steering angle at the minimum steering angle $\theta_{Lmin}$ (L6). The steering end distance Dend is the distance at which the vehicle no longer must be steered to avoid an obstacle, which is set in advance to a value larger than the steering start distance Dstart empirically or by simulation.

When the distance $D_L$ to the obstacle becomes a value greater than the steering end distance Dend, the target steering angle calculation unit 13 then sets the first target steering angle $\theta_L$ to 0 (L7). In this manner, the target steering angle calculation unit 13 calculates the first target steering angle $\theta_L$.

Next, with reference to FIG. 4, the method of calculating the second target steering angle $\theta_R$, which is the target steering angle for avoiding an obstacle located on the right side with respect to the direction of travel of the vehicle 100, will now be described. In FIG. 3, the first target steering angle $\theta_L$ is shown as a positive value, and, in FIG. 4, the second target steering angle $\theta_R$ is shown as a negative value.

Figure 4:
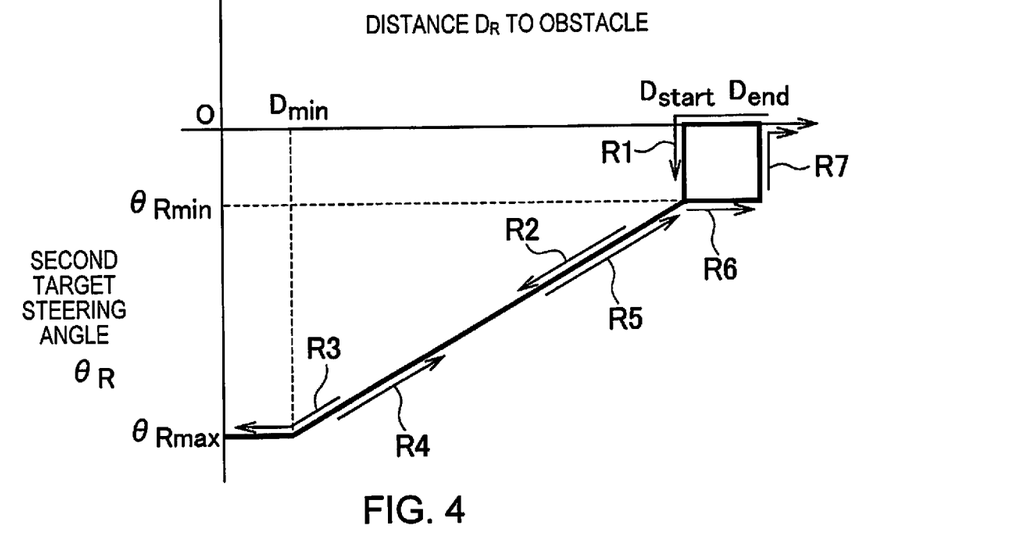
FIG. 4 is a diagram for explaining the method of calculating a second target steering angle by using the steering control device according to the embodiment of the present invention.

As shown in FIG. 4, the target steering angle calculation unit 13 sets the second target steering angle $\theta_R$ to 0 if the distance $D_R$ to the obstacle is greater than a preset steering start distance Dstart. When the distance $D_R$ to the obstacle becomes less than or equal to the steering start distance Dstart, the calculation of the second target steering angle $\theta_R$ is started. That is, the calculation of the second target steering angle $\theta_R$ is started when an obstacle located on the right side with respect to the direction of travel of the vehicle 100 is approached and the distance $D_R$ to the obstacle changes from a value greater than the preset steering start distance Dstart to a value less than or equal to the steering start distance Dstart.

First, when the distance $D_R$ to the obstacle decreases from a value greater than the steering start distance Dstart to the steering start distance Dstart, the target steering angle calculation unit 13 sets the second target steering angle $\theta_R$ to a minimum steering angle $\theta_{Rmin}$ (R1). The minimum steering angle $\theta_{Rmin}$, like the minimum steering angle $\theta_{Lmin}$, is the minimum steering angle set when the steering of the vehicle is started to avoid the obstacle and is set in advance empirically or by simulation.

Then, as the vehicle 100 proceeds and approaches the obstacle as the distance $D_R$ to the obstacle decreases, the second target steering angle $\theta_R$, which is a negative value, is decreased (the absolute value increases) as the distance $D_R$ to the obstacle decreases (R2). That is, the target steering angle calculation unit 13 calculates the second target steering angle $\theta_R$ for moving the vehicle so as to increase in a direction away from the obstacle as the vehicle 100 proceeds, as the distance $D_R$ to the obstacle decreases.

When the distance $D_R$ to the obstacle reaches the minimum steering distance Dmin, the target steering angle calculation unit 13 then sets the second target steering angle $\theta_R$ to the maximum steering angle $\theta_{Rmax}$, and maintains the maximum steering angle $\theta_{Rmax}$, even if the distance $D_R$ to the obstacle further decreases (R3). Here, the maximum steering angle $\theta_{Rmax}$, like the maximum steering angle $\theta_{Lmax}$, is the maximum steering angle set to avoid an obstacle and is set in advance empirically or by simulation.

Then, as the vehicle 100 proceeds, moving away from the obstacle as the distance $D_R$ to the obstacle increases, the second target steering angle $\theta_R$, which is a negative value, is increased (the absolute value decreases) as the distance $D_R$ to the obstacle increases (R4). That is, the target steering angle calculation unit 13 calculates the second target steering angle $\theta_R$, so that the steering angle in the direction away from the obstacle as the vehicle 100 proceeds is decreased as the distance $D_R$ to the obstacle increases.

When the distance $D_R$ to the obstacle changes from a value smaller than the steering start distance Dstart to the steering start distance Dstart, the target steering angle calculation unit 13 then sets the second target steering angle $\theta_R$ to the minimum steering angle $\theta_{Rmin}$ (L5).

Thereafter, while the distance $D_R$ to the obstacle changes from the steering start distance Dstart to an even larger value to the steering end distance Dend, the target steering angle calculation unit 13 maintains the second target steering angle $\theta_R$ at the minimum steering angle $\theta_{Rmin}$ (R6).

When the distance $D_R$ to the obstacle becomes a value greater than the steering end distance Dend, the target steering angle calculation unit 13 then sets the second target steering angle $\theta_R$ to 0 (R7). In this manner, the target steering angle calculation unit 13 calculates the second target steering angle $\theta_R$.

The target steering angle calculation unit 13 stops the vehicle 100 when the distances $D_L$, $D_R$ to the obstacle become less than or equal to a preset vehicle stopping distance. The vehicle stopping distance is a short distance at which it becomes difficult to avoid an obstacle by using steering, which is set in advance to a value smaller than the minimum steering distance Dmin empirically or by simulation.

The final steering angle calculation unit 15 calculates the final steering angle by adding the first target steering angle and the second target steering angle calculated by the target steering angle calculation unit 13. That is, the final steering angle θ is calculated by Equation (1).

Final steering angle θ=first target steering angle $\theta_L$+second target steering angle $\theta_R$     (1)

Since the first target steering angle and the second target steering angle are steering angles in opposite directions, a value that offsets the two is calculated by using addition. For example, the first target steering angle $\theta_L$ described in FIG. 3 is a positive value, and the second target steering angle $\theta_R$ is a negative value; thus, if the sum is positive, the final steering angle θ will be a rightward steering angle, and if negative, a leftward steering angle.

Further, in the prior art, when the distance to the obstacle is less than or equal to a prescribed value, the steering angle is controlled so that the distance to the obstacle increases. However, with this type of steering control, if there are obstacles on either side of the vehicle, the vehicle is repeatedly steered to the left and right to avoid the obstacles, so that the vehicle cannot be moved on a smooth trajectory. In contrast, the final steering angle calculation unit 15 adds the steering angle for avoiding the left-side obstacle and the steering angle for avoiding the right-side obstacle to calculate the final steering angle. As a result, even if there are obstacles on the left and right sides of the vehicle, the vehicle can be moved along a smooth trajectory without being repeatedly steered to the left and right.

The steering control unit 17 controls the steering angle of the steered wheels of the vehicle 100 based on the final steering angle calculated by the final steering angle calculation unit 15. The steering control unit 17 outputs the final steering angle to the steering motor 5 so that the steering angle of the steered wheels of the vehicle 100 becomes the final steering angle. The steering control unit 17 may control the steered wheels of the vehicle 100 only when the vehicle is remotely controlled by the remote control device 7.

The steering motor 5 is an actuator for steering the steered wheels of the vehicle 100, and when the final steering angle is acquired from the steering control unit 17, the steering motor steers the steered wheels of the vehicle 100 to set the final steering angle.

The remote control device 7 is remotely operated by the driver outside of the vehicle to control the vehicle 100. For example, a smart key of the vehicle 100 is provided with forward and reverse switches, and the driver operates these switches outside of the vehicle to move the vehicle 100 forward or backwards to park the vehicle in a parking space.

The steering control device 1 is a controller consisting of a general-purpose electronic circuits, including a microcomputer, microprocessor, and CPU, and peripheral devices such as memory, in which a computer program for executing a steering control process is installed. Each of the functions of the steering control device 1 may be implemented by using one or more processing circuits. The processing circuits include a programmed processing devices, including, for example, electrical circuits, as well as devices such as conventional circuit components and application-specific integrated circuits (ASIC) arranged to execute the functions described in the embodiment.

Figure 5:
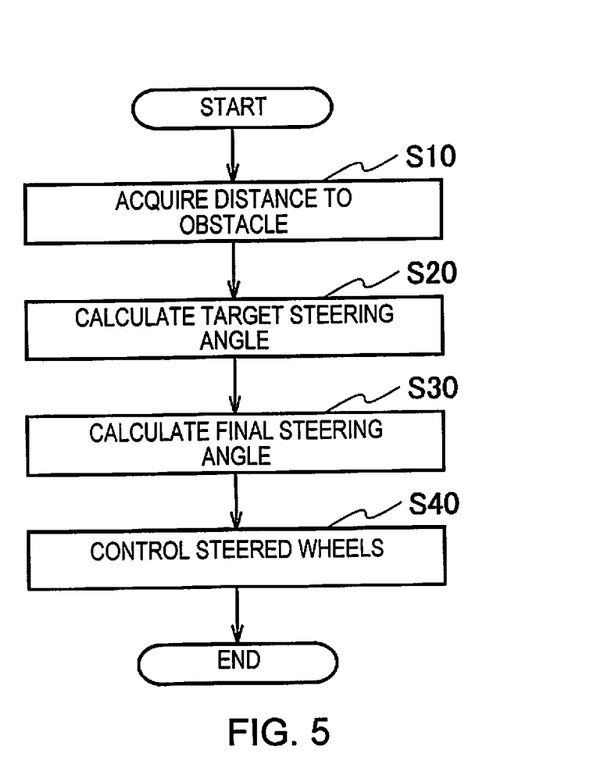
FIG. 5 is a flowchart showing the processing procedure of a steering control process carried out by the steering control device according to the embodiment of the present invention.

The steering control process executed by the steering control device 1 according to the present embodiment will now be described. FIG. 5 is a flowchart showing the processing procedure of a steering control process performed by the steering control device 1 according to the present embodiment.

As shown in FIG. 5, in Step S10, the obstacle distance acquisition unit 11 acquires the distance from the vehicle 100 to the obstacle detected by the distance detection sensor 3. At this time, when the vehicle 100 is traveling forward, the distances from the first left sensor LS1 and the first right sensor RS1 to the obstacles located on the left and right sides of the direction of travel of the vehicle 100 are acquired. Further, when the vehicle 100 is traveling backwards, the distances from the second left sensor LS2 and the second right sensor RS2 to the obstacles located on the left and right sides of the direction of travel of the vehicle 100 are acquired.

In Step S20, the target steering angle calculation unit 13 calculates the first target steering angle and the second target steering angle based on the distances to the obstacles acquired in Step S10. The first target steering angle is a target steering angle for avoiding an obstacle located on the left side with respect to the direction of travel of the vehicle 100, and the second target steering angle is a target steering angle for avoiding an obstacle located on the right side with respect to the direction of travel of the vehicle 100

In Step S30, the final steering angle calculation unit 15 adds the first target steering angle and the second target steering angle calculated in Step S20 to calculate the final steering angle.

Figure 6:
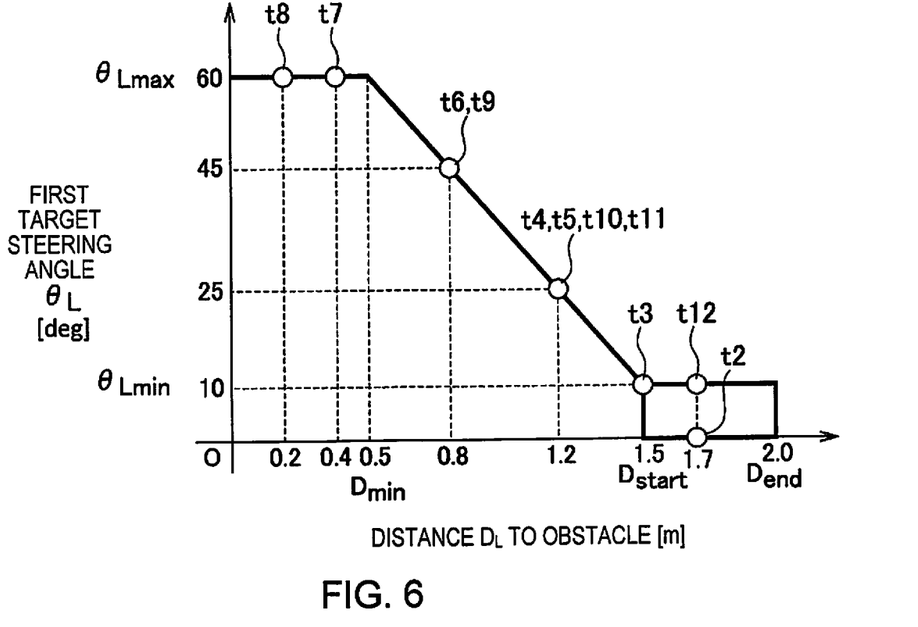
FIG. 6 is a diagram for explaining a specific method of calculating the first target steering angle by using the steering control device according to the embodiment of the present invention.
Figure 7:
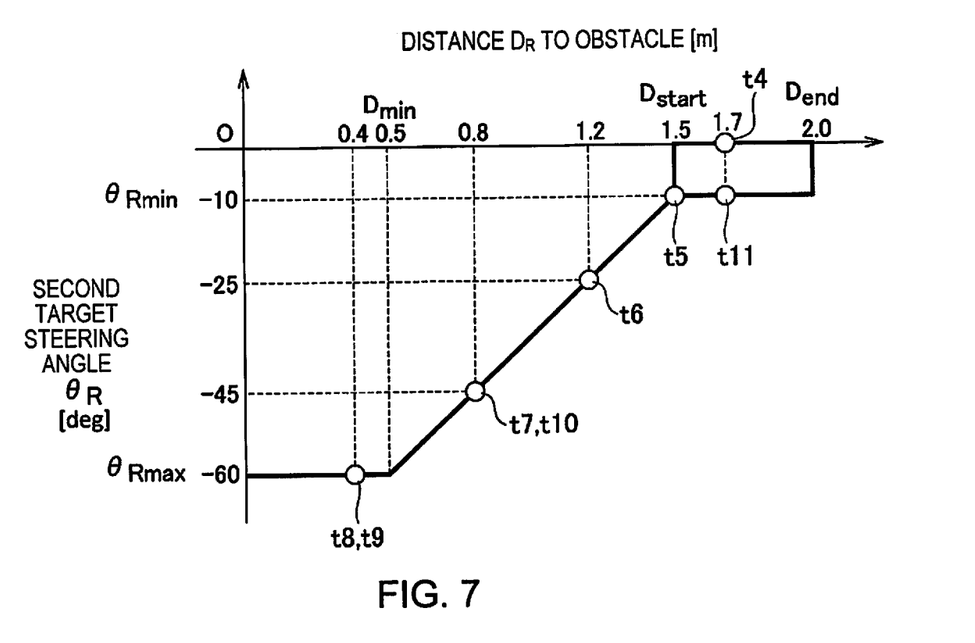
FIG. 7 is a diagram for explaining a specific method of calculating the second target steering angle by using the steering control device according to the embodiment of the present invention.
Figure 8:
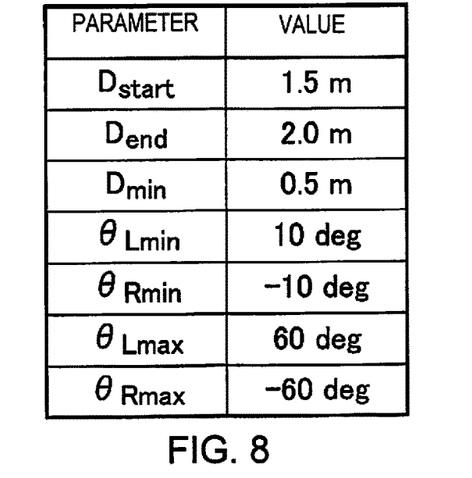
FIG. 8 is a diagram showing a specific example of parameter values used when the steering control device according to the embodiment of the present invention calculates the target steering angle.

Here, a specific method of calculating the target steering angles and the final steering angle will be described with reference to FIGS. 6-9. FIG. 6 is a diagram showing a specific method of calculating the first target steering angle, and FIG. 7 is a diagram showing a specific method of calculating the second target steering angle. In FIGS. 6 and 7, each parameter is set as shown in FIG. 8. That is, the steering start distance Dstart is set to 1.5 m, the steering end distance Dend is set to 2.0 m, and the minimum steering distance Dmin is set to 0.5 m. Further, the minimum steering angles $\theta_{Lmin}$ and $\theta_{Rmin}$ are set to 10 deg and −10 deg, respectively, and the maximum steering angles $\theta_{Lmax}$ and $\theta_{Rmax}$ are set to 60 deg and −60 deg, respectively. Although steering angles are used in this explanation, the vehicle may be controlled using the angle of the steering wheel or the overall steering angle when actually controlling the vehicle.

Figure 9:
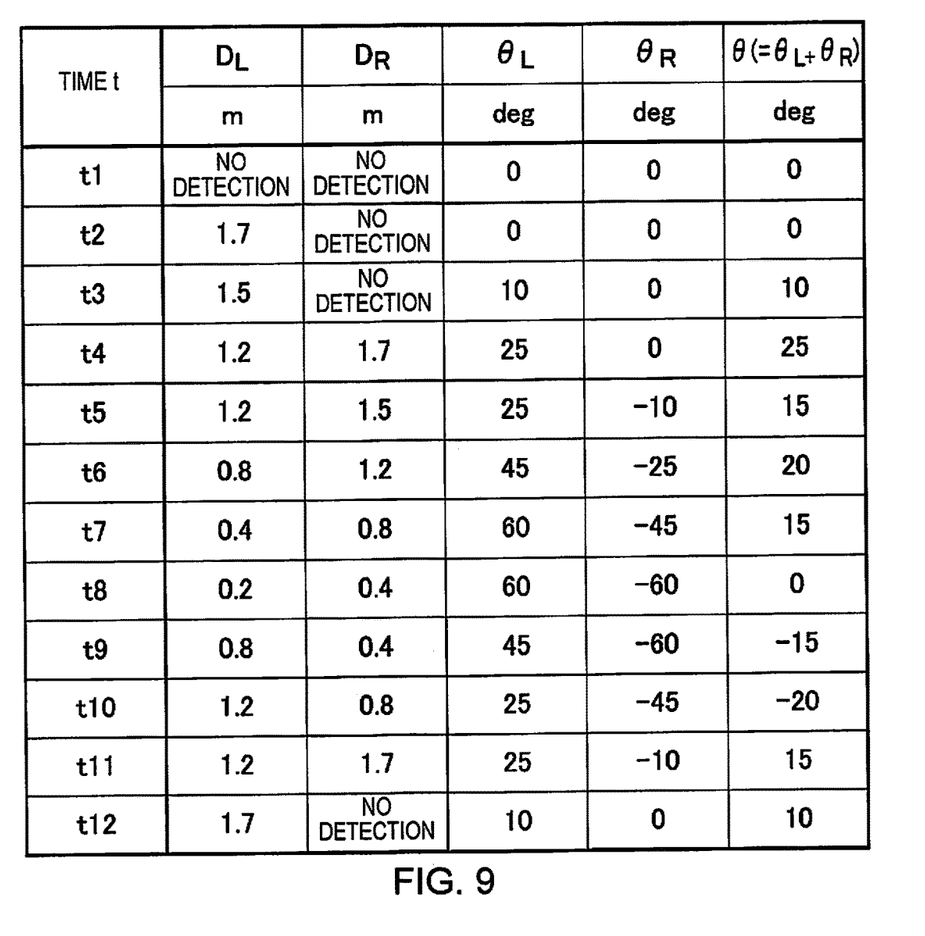
FIG. 9 is a diagram showing a specific example of steering control carried out by the steering control device according to the embodiment of the present invention.

FIG. 9 is a diagram showing specific numerical values when steering control is executed; how the final steering angle is calculated over time will be described with reference to FIG. 9. First, at time t1, since an obstacle has not been detected and the first target steering angle $\theta_L$ and the second target steering angle $\theta_R$ are 0, the final steering angle θ is also 0.

As shown in FIG. 6, at time t2, the distance $D_L$ to the obstacle is detected to be 1.7 m, but because this distance has decreased from 2.0 m or more and is still greater than the steering start distance Dstart, the first target steering angle $\theta_L$ remains 0. The second target steering angle $\theta_R$, on the other hand, is also still 0, so that the final steering angle θ is also 0.

At time t3, since the distance $D_L$ to the obstacle has decreased to 1.5 m, i.e., the steering start distance Dstart, the first target steering angle $\theta_L$ is set to 10 deg, i.e., the minimum steering angle $\theta_{Lmin}$, as shown in FIG. 6. Since the second target steering angle $\theta_R$, on the other hand, is still 0, the final steering angle θ is 10 deg.

As shown in FIG. 6, at time t4, since the distance $D_L$ to the obstacle has decreased to 1.2 m, a steering angle in a direction away from the obstacle is calculated to increase as the distance to the obstacle decreases, and thus the first target steering angle $\theta_L$ is set to 25 deg. As shown in FIG. 7, the distance $D_R$ to the obstacle, on the other hand, is detected to be 1.7 m, but because this distance has decreased from 2.0 m or more and is still greater than the steering start distance Dstart, the second target steering angle $\theta_R$ remains 0. Therefore, the first target steering angle $\theta_L$ of 25 deg and the second target steering angle $\theta_R$ of 0 are added together to set the final steering angle θ to 25 deg.

At time t5, since the distance $D_L$ to the obstacle has remained unchanged at 1.2 m, the first target steering angle $\theta_L$ is not changed and remains 25 deg. As shown in FIG. 7, the distance $D_R$ to the obstacle, on the other hand, has decreased to 1.5 m, i.e., the steering start distance Dstart, so that the second target steering angle $\theta_R$ is set to −10 deg, i.e., the minimum steering angle $\theta_{Rmin}$. Therefore, the first target steering angle $\theta_L$ of 25 deg and the second target steering angle $\theta_R$ of −10 deg are added together to set the final steering angle θ to 15 deg.

As shown in FIG. 6, at time t6, since the distance $D_L$ to the obstacle has decreased to 0.8 m, a steering angle in a direction away from the obstacle is calculated to increase as the distance to the obstacle decreases, and thus the first target steering angle $\theta_L$ is set to 45 deg. As shown in FIG. 7, the distance $D_R$ to the obstacle has decreased to 1.2 m, so that a steering angle in a direction away from the obstacle is calculated to increase as the distance to the obstacle decreases, and thus the second target steering angle $\theta_R$ is set to −25 deg. Therefore, the first target steering angle $\theta_L$ of 45 deg and the second target steering angle $\theta_R$ of −25 degrees are added together to set the final steering angle θ to 20 deg.

As shown in FIG. 6, at time t7, when the distance $D_L$ to the obstacle has decreased to 0.4 m, the first target steering angle $\theta_L$ is set to 60 deg, i.e., the maximum steering angle $\theta_{Lmax}$, since this distance is less than the minimum steering distance Dmin 0.5 m. As shown in FIG. 7, the distance $D_R$ to the obstacle, on the other hand, has decreased to 0.8 m, so that the steering angle in a direction away from the obstacle is calculated to increase as the distance to the obstacle decreases, and thus the second target steering angle $\theta_R$ is set to −45 deg. Therefore, the first target steering angle $\theta_L$ of 60 deg and the second target steering angle $\theta_R$ of −45 deg are added together to set the final steering angle θ to 15 deg.

As shown in FIG. 6, at time t8, the distance $D_L$ to the obstacle has decreased to 0.2 m, but since this distance is less than the minimum steering distance Dmin of 0.5 m, the first target steering angle $\theta_L$ is not changed and remains 60 deg, i.e., the maximum steering angle $\theta_{Lmax}$. When the vehicle stopping distance is set to 0.2 m, the vehicle 100 may be stopped. As shown in FIG. 7, the distance $D_R$ to the obstacle, on the other hand, has decreased to 0.4 m, which is less than the minimum steering distance Dmin 0.5 m, so that the second target steering angle is set to −60 deg, i.e., the maximum steering angle $\theta_{Lmax}$. Therefore, the first target steering angle $\theta_L$ of 60 deg and the second target steering angle $\theta_R$ of −60 deg are added together to set the final steering angle θ to 0.

As shown in FIG. 6, at time t9, since the distance $D_L$ to the obstacle has increased to 0.8 m, a steering angle in a direction away from the obstacle is calculated to decrease as the distance to the obstacle increases, and thus the first target steering angle $\theta_L$ is set to 45 deg. As shown in FIG. 7, the distance $D_R$ to the obstacle, on the other hand, has remained unchanged at 0.4 m, so that the second target steering angle $\theta_R$ is not changed and remains −60 deg. Therefore, the first target steering angle $\theta_L$ of 45 deg and the second target steering angle $\theta_R$ of −60 deg are added together to set the final steering angle θ to −15 deg.

As shown in FIG. 6, at time t10, since the distance $D_L$ to the obstacle has increased to 1.2 m, a steering angle in a direction away from the obstacle is calculated to decrease as the distance to the obstacle increases, and thus the first target steering angle $\theta_L$ is set to 25 deg. As shown in FIG. 7, since the distance $D_R$ to the obstacle, on the other hand, has increased to 0.8 m, a steering angle in a direction away from the obstacle is calculated decrease as the distance to the obstacle increases, and thus the second target steering angle $\theta_R$ is set to −45 deg. Therefore, the first target steering angle $\theta_L$ of 25 deg and the second target steering angle $\theta_R$ of −45 deg are added together to set the final steering angle θ to −20 deg.

As shown in FIG. 6, at time t11, since the distance $D_L$ to the obstacle has remained unchanged at 1.2 m, the first target steering angle $\theta_L$ is not changed and remains 25 deg. The distance $D_R$ to the obstacle, on the other hand, has increased to 1.7 m, changing from a value less than the steering start distance Dstart of 1.5 m to a value greater than the steering start distance Dstart. Therefore, as shown in FIG. 7, the second target steering angle $\theta_R$ is set to the minimum steering angle $\theta_{Rmin}$ of −10 deg and is maintained at −10 deg. Therefore, the first target steering angle $\theta_L$ of 25 deg and the second target steering angle $\theta_R$ of −10 deg are added together to set the final steering angle θ to 15 deg.

At time t12, the distance $D_L$ to the obstacle has increased to 1.7 m, changing from a value less than the steering start distance Dstart of 1.5 m to a value greater than the steering start distance Dstart. Therefore, as shown in FIG. 6, the first target steering angle $\theta_L$ is set to the minimum steering angle $\theta_{Lmin}$ of 10 deg and is maintained at 10 deg. Since the distance $D_R$ to the obstacle, on the other hand, has exceeded the steering end distance Dend of 2.0 m, the second target steering angle $\theta_R$ is set to 0. Therefore, the first target steering angle $\theta_L$ of 10 deg and the second target steering angle $\theta_R$ of 0 deg are added together to set the final steering angle θ to 10 deg.

Thus, the first target steering angle $\theta_L$ and the second target steering angle $\theta_R$ are calculated in Step S20, and the final steering angle θ is calculated in Step S30.

In Step S40, the steering control unit 17 controls the steered wheels of the vehicle 00 based on the final steering angle calculated in Step S30. Specifically, the steering control unit 17 outputs the final steering angle to the steering motor 5, thereby controlling the steered wheels of the vehicle 100 to be the final steering angle. When the steered wheels are controlled in this manner, the steering control process of the present embodiment is completed.

As described above, the steering control device 1 according to the present embodiment calculates a first target steering angle such that a steering angle increases for moving the vehicle in a direction away from the obstacle located on a left side with respect to a traveling direction as the vehicle travels as the distance to the obstacle decreases. On the other hand, a second target steering angle is calculated such that a steering angle increases for moving the vehicle in a direction away from the obstacle located on a right side with respect to the traveling direction as the vehicle travels as the distance to the obstacle decreases. The first target steering angle and the second target steering angle are then added together to calculate a final steering angle, and steered wheels of the vehicle are controlled based on the final steering angle. As a result, a vehicle can be moved smoothly while avoiding obstacles, even if such obstacles are detected as the vehicle is being moved. In particular, since the steering angle in the right direction and the steering angle in the left direction are added to calculate the final steering angle, even if there are obstacles on the left and right sides of the vehicle, the vehicle can be moved along a smooth trajectory without being repeatedly steered to the left and right.

Also, in the steering control device 1 according to the present embodiment, the calculation of the first or second target steering angle is started when the distance from the vehicle to the obstacle changes from a value greater than a preset steering start distance to a value less than or equal to the steering start distance. This allows the calculation of the target steering angle to be initiated at the correct timing to start steering to avoid the obstacle.

Further, in the steering control device 1 according to the present embodiment, when the distance from the vehicle to the obstacle changes from a value smaller than the steering start distance to the steering start distance, the first or the second target steering angle is set to a preset minimum steering angle. Then, while the distance from the vehicle to the obstacle changes from the steering start distance to the steering end distance, which is set to a value greater than the steering start distance, the first or the second target steering angle is maintained at the minimum steering angle. This prevents the target steering angle from decreasing during the interval between the steering start distance to the steering end distance, thereby ensuring that the vehicle reliably avoids the obstacle.

Further, when the distance from the vehicle to the obstacle becomes greater than the steering end distance, the steering control device 1 according to the present embodiment sets the first or the second target steering angle to 0. This allows the vehicle to end steering for obstacle avoidance when the vehicle has moved sufficiently far from the obstacle.

Further, in the steering control device 1 according to the present embodiment, the vehicle is stopped once the distance from the vehicle to the obstacle becomes less than or equal to the preset vehicle stopping distance. This prevents the vehicle from coming in contact with the obstacle.

Further, in the steering control device 1 according to the present embodiment, the distance detection sensor 3 consists of a left sensor LS that detects the distance to an obstacle located on the left side with respect to the direction of travel of the vehicle and a right sensor RS that detects the distance to an obstacle located on the right side with respect to the direction of travel of the vehicle. The first target steering angle is then calculated based only on the distance to the obstacle detected by the left sensor LS, and the second target steering angle is calculated based only on the distance to the obstacle detected by the right sensor RS. As a result, since the steering control is executed based only on the distance to the obstacle, it is not necessary to determine the position of the obstacle, etc., so that steering control for obstacle avoidance can be executed simply by performing uncomplicated arithmetic computations.

Furthermore, in the steering control device 1 according to the present embodiment, the left sensor and the right sensor comprises sonar devices that emit sound waves within a prescribed range and detect the distance to the obstacle from the vehicle based on the reflected waves from the obstacle. This allows the use of an inexpensive configuration for performing steering control for obstacle avoidance.

Further, in the steering control device 1 according to the present embodiment, the vehicle 100 can be remotely controlled by using the remote control device 7 operated by a driver outside of the vehicle, and the control of the steered wheels of the vehicle 100 is executed only when the vehicle is being remotely controlled by the remote control device 7. This allows the steering control of the present embodiment to be applied to the control of the vehicle when the vehicle is moved by using remote control.

The above-described embodiment is one example of the present invention. Therefore, the present invention is not limited to the embodiment described above, and various changes may, of course, be made in terms of design, etc., even in a form other than this embodiment, as long as such changes do not depart from the technical concept of the present invention.

The invention claimed is:

1. A steering control method for controlling a steering of a vehicle equipped with a distance detection sensor that detects a distance to obstacles located around the vehicle, the method comprising:
    acquiring a distance from the vehicle to the obstacles detected by the distance detection sensor;
    calculating a first target steering angle such that a steering angle increases for moving the vehicle in a direction away from the obstacle located on a left side with respect to a traveling direction as the vehicle travels as the distance to the obstacle decreases;
    calculating a second target steering angle such that a steering angle increases for moving the vehicle in a direction away from the obstacle located on a right side with respect to the traveling direction as the vehicle travels as the distance to the obstacle decreases,
    adding the first target steering angle and the second target steering angle to calculate a final steering angle, and
    controlling steered wheels of the vehicle based on the final steering angle.

2. The steering control method according to claim 1, wherein
    the calculating of the first target steering angle or the second target steering angle is initiated when the distance from the vehicle to the obstacle changes from a value greater than a preset steering start distance to a value less than or equal to a steering start distance.

3. The steering control method according to claim 2, wherein
    when the distance from the vehicle to the obstacle changes from a value smaller than the steering start distance to the steering start distance, the first second target steering angle or the second target steering angle is set to a preset minimum steering angle, and
    the first target steering angle or the second target steering angle is maintained at a minimum steering angle during a time that the distance from the vehicle to the obstacle changes from the steering start distance to a steering end distance that is set to a value greater than the steering start distance.

4. The steering control method according to claim 3, wherein
    the first target steering angle or the second target steering angle is set to zero when the distance from the vehicle to the obstacle becomes greater than the steering end distance.

5. The steering control method according to claim 1, wherein
the vehicle is stopped when the distance from the vehicle to the obstacle becomes less than or equal to a preset vehicle stopping distance.

6. The steering control method according to claim 1, wherein
the distance detection sensor comprises a left sensor that detects the distance to the obstacle located on the left side with respect to the traveling direction of the vehicle and a right sensor that detects the distance to the obstacle located on the right side with respect to the traveling direction of the vehicle,
the first target steering angle is calculated based only on the distance to the obstacle detected by the left sensor, and
the second target steering angle is calculated based only on the distance to the obstacle detected by the right sensor.

7. The steering control method according to claim 6, wherein
the left sensor and the right sensor are sonar devices that emit sound waves within a prescribed range and detect the distance from the vehicle to the obstacle based on reflected waves from the obstacle.

8. The steering control method according to claim 1, wherein
the vehicle is configured to be remotely controlled by using a remote control device operated outside of the vehicle by a driver, and the steered wheels of the vehicle are control only when the vehicle is being remotely controlled by the remote control device.

9. A steering control device for controlling a steering of a vehicle equipped with a distance detection sensor that detects a distance to obstacles located around the vehicle, the steering control device being configured to
acquire a distance from the vehicle to the obstacles detected by the distance detection sensor;
calculate a first target steering angle such that a steering angle increases for moving the vehicle in a direction away from the obstacle located on a left side with respect to a traveling direction as the vehicle travels as the distance to the obstacle decreases;
calculate a second target steering angle such that a steering angle increases for moving the vehicle in a direction away from the obstacle located on a right side with respect to the traveling direction as the vehicle travels as the distance to the obstacle decreases;
add the first target steering angle and the second target steering angle to calculate a final steering angle; and
control steered wheels of the vehicle based on the final steering angle.

* * * * *